United States Patent [19]

Smith

[11] Patent Number: 4,648,352
[45] Date of Patent: Mar. 10, 1987

[54] WEIGHTED HEELING ROPE

[76] Inventor: R. Leon Smith, Rte. 1, Box 25, Texico, N. Mex.

[21] Appl. No.: 822,281

[22] Filed: Jan. 24, 1986

[51] Int. Cl.⁴ ........................................... A01K 29/00
[52] U.S. Cl. .................................................. 119/153
[58] Field of Search ............... 119/153; 446/247, 236, 446/490; 273/200

[56] References Cited

U.S. PATENT DOCUMENTS

| | | | |
|---|---|---|---|
| 504,055 | 8/1893 | Shaw | 119/153 |
| 1,953,565 | 4/1934 | O'Neil | 446/247 |
| 2,643,638 | 6/1953 | Villmer | 119/153 |
| 2,669,221 | 2/1954 | Major | 119/153 |
| 3,165,091 | 1/1965 | Welton | 119/153 |

Primary Examiner—Hugh R. Chamblee
Attorney, Agent, or Firm—Harvey B. Jacobson

[57] ABSTRACT

A heeling rope is provided having the usual hondo formed one end of the rope and a loop being formed by the other end portion of the rope being passed through and slidingly received in the hondo. The loop tip opposite that portion of the loop parallelling the spoke of the rope is weighted throughout a longitudinal extent of the loop generally equal to one-third the peripheral size of the loop. The weighted portion of the loop retains substantially all of its flexibility although slight stiffening of the weighted portion of the loop does exist and the weighting of the loop tip greatly facilitates the feel of the loop by the user immediately prior to release of the loop and spoke of the rope during a heeling roping operation.

10 Claims, 5 Drawing Figures

U.S. Patent    Mar. 10, 1987    4,648,352
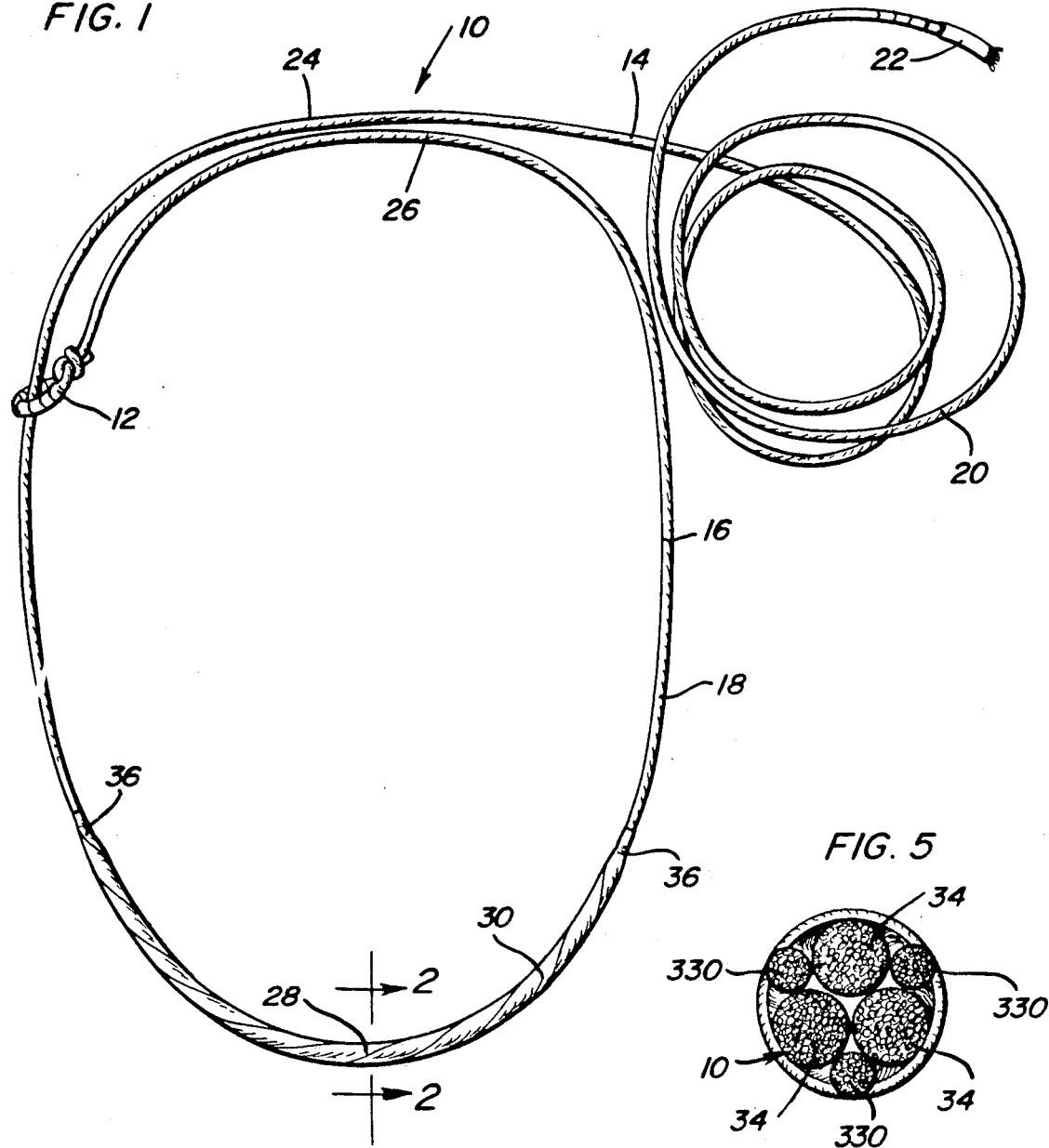

WEIGHTED HEELING ROPE

BACKGROUND OF THE INVENTION

1. Field of the Invention

This invention relates to a heeling rope incorporating the improvement wherein a short length portion of that portion of the rope forming the loop therein is weighted in an area remote from the spoke of the rope when the loop is of the usual size to be thrown by the user.

2. Description of Related Art

Various different forms of weighted ropes as well as ropes including improved hondos and enlarged handles and which incorporate some of the general structural features of the instant invention are disclosed in U.S. Pat. Nos. 1,438,993, 1,953,565, 1,993,010, 2,044,240, 2,503,567, 2,669,221, 2,771,857 and 3,165,091. However, these previously known devices are not specifically designed to improve the ability of a person throwing a heeling rope.

SUMMARY OF THE INVENTION

The heeling rope of the instant invention is primarily a conventional heeling rope comprising a length of line having a hondo formed on one end through which a major length portion of the line extends with the remaining minor length portion of the line forming a loop. The line is slidably received through the hondo, as is conventional, whereby the loop may be tightened about an object about which it passes responsive to the line being tensioned between the hondo and the other end thereof. The loop initially is of a size preferred by the user at the beginning of a heeling roping operation to enable the user to cast the loop in an accurate manner and a portion of the loop remote from the hondo and substantially opposite the spoke of the rope is weighted to increase the "feel" of the rope immediately prior to release of the loop and the spoke by the user.

The weighted portion of the rope may be weighted either by a flexible exterior covering extending at least substantially completely thereabout and throughout a reasonable peripheral portion of the loop, or elongated flexible center member may be disposed between the twisted strands of the rope and extend throughout the length of the weighted area of the rope. Further, small diameter rope sections may be braided about the length of the rope to be weighted either with or against the lay of the multistrands of the rope.

The main object of this invention is to provide a heeling rope which affords greater "feel" to the user of the rope immediately prior to release of the rope loop and spoke by the user.

Another object of this invention, in accordance with the preceding object, is to provide a heeling rope whose loop is weighted in an area thereof spaced from the hondo of the rope and substantially opposite the spoke of the rope.

Still another object of this invention is to provide means for weighting the loop of a heeling rope opposite the spoke thereof and with the rope being weighted through the utilization of an exterior flexible wrap extending about the portion of the rope loop opposite the spoke.

Yet another object of this invention is to provide an elongated flexible internal weight member about which the rope strands are twisted in order to provide the desired weighting of the rope loop.

A further object of this invention is to provide a weighted portion of a heeling rope loop opposite the spoke of the rope wherein the weighted portion is defined by additional small diameter flexible rope strands interwoven or braided about the rope into or against the lay of the rope strands thereof.

A final object of this invention to be specifically enumerated herein is to provide a weighted heeling rope loop in accordance with the preceding objects and which will conform to conventional forms of manufacture, be of simple construction and easy to use so as to provide a device that will be economically feasible, longlasting and capable of increasing the accuracy of the user of a heeling rope.

These together with other objects and advantages which will become subsequently apparent reside in the details of construction and operation as more fuly hereinafter described and claimed, reference being had to the accompanying drawings forming a part hereof, wherein like numerals refer to like parts throughout.

BRIEF DESCRIPTION OF THE DRAWINGS

FIG. 1 is a plan view of a weighted heeling rope constructed in accordance with the present invention;

FIG. 2 is an enlarged fragmentary vertical sectional view taken substantially upon the plane indicated by the section line 2—2 of FIG. 1 and illustrating a first manner of weighting the loop portion of the rope opposite the spoke thereof;

FIG. 3 is a sectional view similar to FIG. 2 but illustrating a second manner of weighting the rope loop portion;

FIG. 4 is a sectional view similar to FIG. 2 but illustrating a third manner of weighting the rope loop;

FIG. 5 is a similar view similar to FIG. 2 illustrating a fourth manner of weighting the rope loop.

DESCRIPTION OF THE PREFERRED EMBODIMENTS

Referring now more specifically to the drawings the numeral 10 generally designates a heeling rope including a hondo 12 formed in one end and wherein a major length portion 14 of the rope 10 is passed through the hondo 12 in a manner such that the remaining minor length portion 16 of the rope 10 defines a loop 18. The rope is slidably received through the hondo 12 and the loop 18 may be tightened about an object around which it is disposed by tension being applied to the major length portion 14. The rope 10 includes a coiled portion 20 comprising a part of the major length portion 14 and terminating in a tail 22. In addition, the rope 10 defines a spoke 24 lying against or closely paralleling the portion 26 of the loop 18 and the loop 18 defines a tip 28 directly opposite the spoke 24 and the portion 26 of the loop 18.

The foregoing comprises a description of a conventional form of heeling rope.

The improvement of the instant invention resides in the provision of weight means 30 extending along generally one-third the length of the minor length portion 16 of the rope 10 defining the loop 18. The weight means 30 comprises a spiral wrap of leather stripping 32 disposed about the spiraled or twisted strands 34 of the rope 10 in the covered and weighted area thereof. The leather stripping 32 is flexible and maybe secured to the rope 10 at the end of the opposite ends of the weight means 30 in a manner such that the weight means 30 tapers toward the rope 10 as at 36 to facilitate sliding of the minor length portion 16 through the hondo 12 as the loop 18 is tightened during usage.

With attention now invited more specifically to FIG. 3 of the drawings, there may be seen a second form of weight means 130 which comprises a molded cylindrical body of flexible plastic disposed about that portion of the loop 18 to be weighted. Here again, the opposite ends of the weight means 130 are also tapered toward the adjacent uncovered portions of the loop 18.

With attention now invited more specifically to FIG. 4, a third form of weight means is referred to by the reference numeral 230. The weight means 230 comprises an elongated, small diameter weight member extending along the center line of the rope 10 and about which the twisted strands 34 of the rope 10 are spiraled. In this manner, the weighted portion of the loop 18 may be of the same diameter or only slightly larger than the remainder of that portion of the rope 10 defining the loop 18.

With attention now invited more specifically to FIG. 5 of the drawings, there may be seen a fourth form of weight means referred to by the reference numeral 330 and comprising multiple small diameter twisted strands 330 spiraled about the rope 10 in the lay of the rope between adjacent strands 34 thereof. In addition, the strands 330 also may be spiraled about the rope 10 against the lay of the rope 10. In any event, the opposite ends of the portion of the rope 10 defined by the weight means 330 also will be tapered toward the non-weighted portions of the loop 18.

When preparing to throw the rope the user grasps the spoke 24 and the adjacent portion 26 of the loop 18 in his hand and as the user swings the loop 18 and spoke in a generally circular motion immediately prior to release of the loop and the spoke the weight means 30 or any of the weight means 130, 230 and 330 renders the user of the rope a more definite feel of the position of the tip 28 of the loop 18 relative to his hand and thus to the positioning of the tip 28 in the arc about which it is being swung immediately prior to release of the loop 18. This results in the user being able to more accurately throw the loop 18.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A weighted heeling rope comprising a length of line having a hondo formed on one end through which a major length portion of the line extends with the remaining minor length portion of the line forming a loop and with the line slidably received through said hondo, whereby the loop may be tightened about an object about which it passes responsive to said line being tensioned between said hondo and the other end thereof, said minor length portion including an intermediate short length portion thereof which is weighted, substantially evenly throughout the length of said short length portion.

2. The rope of claim 1 wherein said short length portion is slightly enlarged in diameter relative to said minor length portion, the opposite ends of the diametrically enlarged short length portion tapering in diameter toward the adjacent portions of the minor length portion of said rope for ease and passage of said short length portion through said hondo.

3. The rope of claim 1 wherein said line comprises a multistrand line with the multistrands thereof spiral to the same direction about the center axis of said line.

4. The rope of claim 3 wherein said short length portion is weighted by the utilization of a flexible outer wrap layer disposed about said line throughout the length of said short length portion.

5. The rope of claim 4 wherein said outer wrap layer comprises an outer layer of leather.

6. The rope of claim 3 wherein said short length portion is weighted by the utlization of an elongated, small diameter and flexible weight member extending at least substantially throughout the length of said short length portion along the center line thereof between the spiraled strands of said line.

7. The rope of claim 3 wherein said short length portion is weighted by the utilization of additional flexible line strands as spiraled about said line at least substantially throughout the length of said short length portion.

8. The rope of claim 7 wherein said additional flexible line strands are spiraled about said line with the lay of the multistrands of said line.

9. The rope of claim 7 wherein said additional flexible line strands are spiraled about said line against the lay of the multiple strands thereof.

10. The rope of claim 3 wherein said short length portion is weighted by the utilization of a flexible outer covering of plastic extending about said short length portion throughout at least substantially the entire length thereof, the opposite ends of said covering tapering in diameter toward the adjacent portions of the remainder of said minor length portion of said line.

* * * * *